United States Patent [19]

Leung et al.

[11] Patent Number: 5,887,132
[45] Date of Patent: *Mar. 23, 1999

[54] NETWORK HUB INTERCONNECTION CIRCUITRY

[75] Inventors: Tommy Y. Leung, San Jose; Mark Edward Tanner, Dublin, both of Calif.

[73] Assignee: Asante Technologies, Inc., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 567,580

[22] Filed: Dec. 5, 1995

[51] Int. Cl.$^6$ .................................................. G06F 13/00
[52] U.S. Cl. ............................ 395/200.3; 395/200.5; 395/280; 395/200.79; 395/282; 395/284; 395/309; 395/830
[58] Field of Search ............................ 395/200.3, 200.5, 395/284, 280, 282, 309, 830, 200.79

[56] References Cited

U.S. PATENT DOCUMENTS

| | | | |
|---|---|---|---|
| 4,162,818 | 7/1979 | Martin | 339/112 R |
| 4,401,351 | 8/1983 | Record | 339/17 LM |
| 4,589,063 | 5/1986 | Shah et al. | 364/200 |
| 4,674,085 | 6/1987 | Aranguren et al. | 370/85 |
| 4,714,435 | 12/1987 | Stipanuk et al. | 439/496 |
| 4,787,082 | 11/1988 | Delaney et al. | 370/85 |
| 5,038,320 | 8/1991 | Heath et al. | 364/900 |
| 5,041,023 | 8/1991 | Lytle | 439/637 |
| 5,204,669 | 4/1993 | Dorfe et al. | 340/825.52 |
| 5,226,120 | 7/1993 | Brown et al. | 395/200 |
| 5,265,238 | 11/1993 | Canova, Jr. et al. | 395/500 |
| 5,313,595 | 5/1994 | Lewis et al. | 395/325 |
| 5,337,310 | 8/1994 | Selyutin | 370/85.3 |
| 5,371,897 | 12/1994 | Brown et al. | 395/800 |
| 5,408,616 | 4/1995 | Murr | 395/325 |
| 5,440,181 | 8/1995 | Gruender, Jr. et al. | 307/156 |
| 5,442,644 | 8/1995 | Heflin et al. | 395/184.01 |
| 5,495,580 | 2/1996 | Osman | 395/187.01 |
| 5,542,854 | 8/1996 | Bowen | 439/157 |
| 5,556,286 | 9/1996 | Ikesugi et al. | 439/74 |
| 5,606,664 | 2/1997 | Brown et al. | 395/200.1 |
| 5,668,809 | 9/1997 | Rostoker et al. | 370/392 |
| 5,675,735 | 10/1997 | Gallagher et al. | 395/200.01 |
| 5,687,174 | 11/1997 | Edem et al. | 370/446 |
| 5,737,334 | 4/1998 | Prince et al. | 370/395 |
| 5,751,967 | 5/1998 | Raab et al. | 395/200.58 |
| 5,754,777 | 5/1998 | Lee | 395/200.34 |
| 5,761,201 | 5/1998 | Vaudreuil | 370/392 |
| 5,809,024 | 9/1998 | Ferguson et al. | 370/395 |
| 5,809,253 | 9/1998 | Gallagher et al. | 395/200.58 |

*Primary Examiner*—Ayaz R. Sheikh
*Assistant Examiner*—Valerie Darbe
*Attorney, Agent, or Firm*—Burns, Doane, Swecker & Mathis, LLP

[57] ABSTRACT

A circuit for interconnecting electrical components in a stacked arrangement by the use of connector elements in which a substantially continuous bus is formed by the connector elements and the components to conduct signals between the components in the arrangement. The circuit and arrangement include identifier circuitry for automatically assigning an identifier to each electrical component in the stack and terminating circuitry for selectively establishing terminating connections between a terminal electrical component of the stack and the substantially continuous signal bus. The identifier circuitry and the terminating circuitry can be implemented by programmable array logic located in each electrical component.

25 Claims, 2 Drawing Sheets

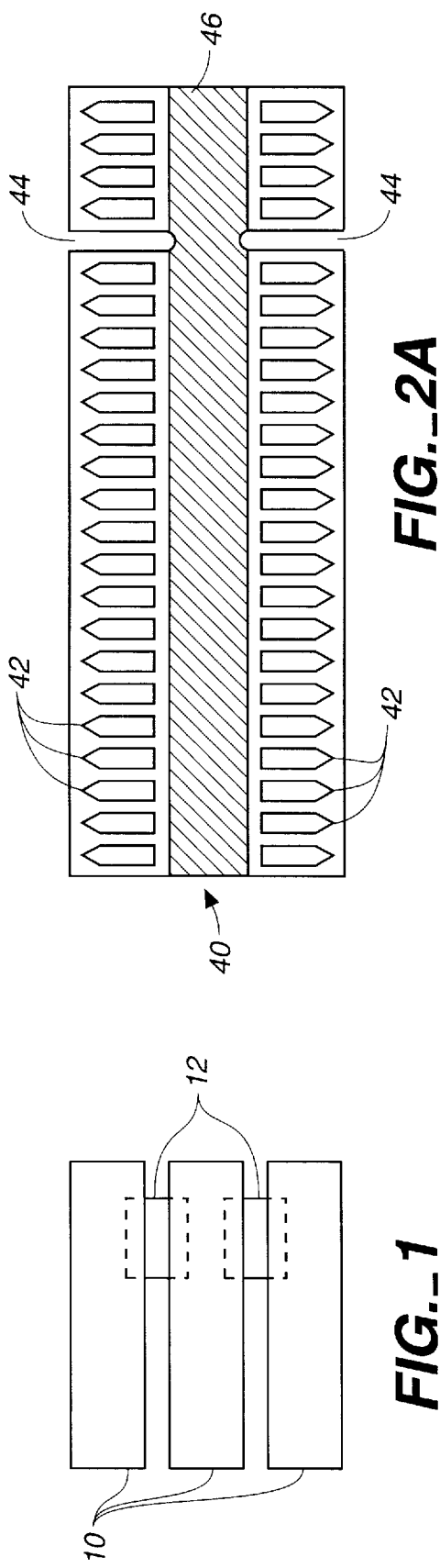

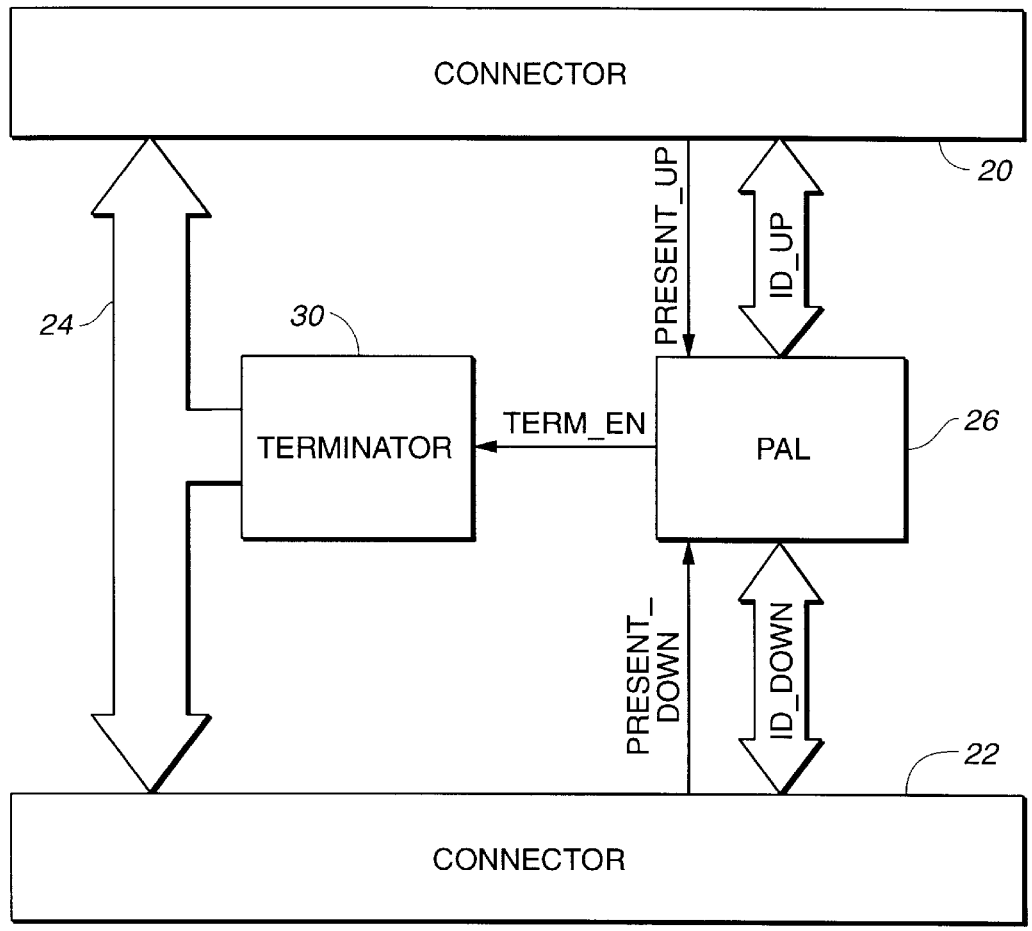
FIG._3
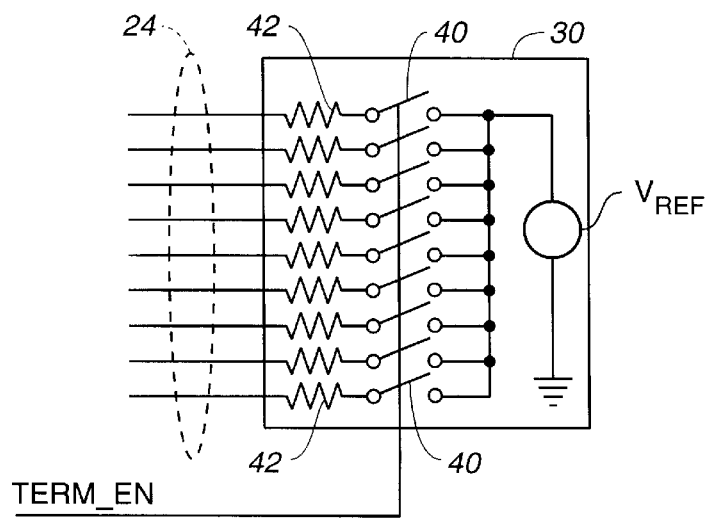
FIG._4

NETWORK HUB INTERCONNECTION CIRCUITRY

FIELD OF THE INVENTION

The present invention relates generally to hubs used to interconnect electrical components in a communications network. More particularly, the present invention relates to circuitry for interconnecting a group of hubs in a stacked configuration.

BACKGROUND OF THE INVENTION

In a communications network, large numbers of components such as computers, workstations, or file servers, are electrically connected by a communication network technology such as ethernet, asynchronous transfer mode (ATM), fiber distributed data interface (FDDI), a technology known as TP-PMD (a copper-wire derivative of FDDI), and a networking technology known as 100 VG-AnyLAN, which uses an access method called demand priority access method (DPAM). An ethernet or other communication network typically includes a hub which is connected to the of components by communication cables, and which allows the computers, workstations, or file servers to exchange data signals. Data signals sent from a transmitting component to a receiving component are transmitted to the hub and repeated at the hub for transmission to the receiving component. The hub enables multiple computers, workstations, or file servers to share resources in a variety of applications. These applications include client-server database systems, in which a back-end database "engine" handles queries from multiple client front-ends running on desktop personal computers. The volume of data carried over the communication network escalates considerably as new users, new applications software, and more powerful computers or workstations are added to the network. As the volume of data carried over the network increases toward the maximum capacity, the data transfer rate through the hub and communication cables decreases, causing delays in computer applications and severely reducing the effectiveness of the network. Further, as the number of users associated with a network increases, more access ports are needed. To alleviate this problem, it is highly desirable to increase the capacity and/or the speed of the network.

A typical network hub includes one or more devices for routing data transfers between a number of ports (e.g., 12) in a workgroup. Each port may be assigned to one or more individual users or one or more individual computers, workstations, or servers. To increase the number of ports available to a workgroup, multiple hubs may be connected. Hub connections are typically achieved by uplink cables, such as unshielded twisted pair (UTP) cables, shielded twisted pair (STP) cables, or fiber optic cabling. In large, complex networks, a significant number of cables may be required. Cables present significant design limitations. For example, the total length of cable between hub units in a high-speed (e.g., 100 megabits per second) network must be less than 205 meters, and the total length of cable from a hub unit to a computer or other component must be less than 100 meters. Further, cables cause signal delay which can contribute to delays in network applications; thus, longer cables cause increased delay. In addition, signal reflection occurs at cable termination or connection points; thus, an increased number of cables causes increased delay. The reflected signals at the cable termination points contribute to signal degradation and inhibit network performance.

When a group of network hubs are connected together to increase the capacity of a network, each hub in the arrangement must typically be assigned a unique identifier to allow for proper arbitration and communication of signals between the network hubs and the network devices connected to the network hubs. The unique identifiers are typically assigned using software or through the use of DIP switches, both of which require input from a network administrator. Terminating connections are typically required at the first and last network hubs in the arrangement to allow the signals on the connecting cables to propagate and to prevent signal reflection.

Accordingly, it would be desirable for a communication network hub or other arrangement of electrical components to be easily set up and expanded without the concerns of signal reflection, propagation delay, identification assignment, and poor propagation of signals between hubs or network devices.

SUMMARY OF THE INVENTION

To overcome the above problems, and to provide other advantages, the present invention provides for an arrangement of electrical components, such as communication network hubs connected by connector elements, and a circuit for interconnecting electrical components such as network hubs in a communications network, each network hub including an identifier means for automatically generating a unique identifier for each component in the arrangement. Each network hub in the arrangement can further include a terminating means for selectively establishing a terminating connection in a connector element if the network hub is a first hub or last hub in the arrangement. The terminating connection can be established by connecting a matching impedance between a hub and a substantially continuous bus formed by the components and the connector elements. The identification means and terminating means can be implemented by programmable array logic. The programmable array logic generates unique identifiers by receiving a first identification signal as a first unique identifier, incrementing the first identification signal to generate a second unique identifier, and transmitting the second unique identifier through a connector element to the next hub in the arrangement as an identification signal.

The network hubs can be communication network hubs for exchanging communication signals between network devices such as computers, workstations, file servers, or other devices. According to exemplary embodiments, the hubs can include a plurality of substantially identical receiving slots for receiving connector elements to electrically connect two network hubs. The connector elements can include a dielectric connector body which is provided with electrical traces disposed on the connector body for cooperating with electrical contacts disposed in the receiving slots such that the electrical traces are brought into electrical contact with the electrical contacts when a connector element is inserted into a receiving slot. The connector element can also include an aligning means such as a slotted groove on the connector body which cooperates with an aligning element disposed in the receiving slot for ensuring the proper alignment of electrical traces and electrical contacts.

BRIEF DESCRIPTION OF THE DRAWINGS

A more complete understanding of the present invention will result from taking the following Detailed Description of Preferred Embodiments in conjunction with the attached drawings in which like reference numerals indicate like elements, and in which:

FIG. 1 is a diagram of an arrangement of interconnected network hubs according to an embodiment of the present invention;

FIGS. 2A–B are diagrams showing a perspective view and a cross-sectional view, respectively, of a connector element according to an embodiment of the present invention;

FIG. 3 is a block diagram of a circuit for interconnecting electrical components according to an embodiment of the present invention; and FIG. 4 is a schematic diagram of an implementation of a terminating circuit of the circuit of FIG. 3.

DETAILED DESCRIPTION OF PREFERRED EMBODIMENTS

Referring now to FIG. 1, an arrangement of interconnected electrical components according to one embodiment of the present invention is shown. The electrical components shown are in the form of ethernet network hubs 10 arranged in a stack and connected by connector elements 12 such as those which will be described below with reference to FIG. 2. The hubs 10 are stacked together, and the hubs and connector elements 12 form a substantially continuous signal bus for conducting signals between the hubs 10 and between the network devices (not shown) connected to the hubs 10.

Referring now to FIG. 2A, a perspective view showing a face of a connector element 40 according to one embodiment of the present invention is shown. The connector element 40 has a substantially rectangular body, and electrical traces 42 are disposed on the connector element 40, such as by printing. The electrical traces 42 include ground traces and signal traces which are brought into electrical contact with ground contacts and signal contacts, respectively, of an electrical component when the connector element 40 is inserted into in the receiving slots provided in the electrical component. The connector element 40 can be provided with one or more slotted grooves such as slotted grooves 44. The slotted grooves 44 provide an aligning means to ensure that the ground traces and signal traces are brought into electrical contact with the appropriate ground contacts and signal contacts, respectively, when the connector element is inserted into a receiving slot of an electrical component. It will be appreciated that other suitable aligning means, such as bumps located on the surface of the connector element 40 or projections extending from the connector element 40, can be used instead of the slotted grooves 44. It will be further appreciated that the signal traces and ground traces comprising signal traces 42, as well as the corresponding signal contacts and ground contacts located in the receiving slots of the network hubs, may be arranged so that no aligning means is necessary. The connector element 40 can also be provided with a layer 46 of electrically conductive material located on a portion of each face of the connector element 40. The electrically conductive layer 46 serves as a grounding shield to protect the connector element from the effects of RF interference.

Referring now to FIG. 2B, a cross-sectional view of the connector element 40 is shown. The connector element 40 includes an inner layer 48 which contains dielectric material 50 and electrically conductive signal leads 48G and 48S for appropriately conducting electrical signals between ground traces and between signal traces, respectively. Signal leads 48G and 48S can be formed, for example, by depositing copper layers on inner layer 48 and etching the copper layer to form signal leads 48G and 48S. The inner layer 48, and signal leads 48G and 48S, are surrounded by the dielectric material 50, and the signal traces 42 (not shown) are printed on the edges of each surface of the dielectric material 50.

Signal leads 48G and 48S are appropriately connected between ground traces and signal traces, respectively, through dielectric material 50. Conductive layers 46 are provided on portions of opposite surfaces of the connector element 40 as grounding RF shields. Signal leads 48G are connected to ground shields 46 as shown. The conductive layers 46 preferably cover at least the portions of the connector element 40 which are exposed between the interconnected components. It will be appreciated that the connector element 40 is constructed so as to form a microstrip which is protected from RF interference by the grounding shields 46. It will be further appreciated that the dimensions of the dielectric material 50 and the dimensions of the signal leads 48G and 48S may be selected to ensure that the impedance of the connector element 40 matches the impedance of the driving circuits of the electrical components to be connected. By tuning the impedance of the connector element 40, signal reflection and degradation is significantly less than that in network hubs which use conventional cables. The arrangement of FIG. 1 and connector element of FIGS. 2A–B are described in more detail in applicant's copending, commonly assigned application entitled "CONNECTOR ELEMENT AND COMPONENT ARRANGEMENT FOR A STACKABLE COMMUNICATIONS NETWORK HUB", which is incorporated herein by reference.

Referring now to FIG. 3, a functional block diagram of a circuit for interconnecting electrical components in an arrangement, such as the stacked arrangement of network hubs depicted in FIG. 1, is shown. The circuit of FIG. 3 is preferably contained in a network hub or other electrical component. The circuit shown is an example of a circuit in a hub in the middle of a stack, and thus includes a top connector 20 and a bottom connector 22, which are preferably connector elements of the type shown in FIG. 2. It will be appreciated that the circuits in the hubs located at the top or bottom of a stack would not include a top connector or bottom connector, respectively. The connector elements are connected by one or more busses such as bus 24 for communicating data and control signals. The circuit of FIG. 3 also includes programmable array logic (PAL) 26 which receives a PRESENT_DOWN signal and an ID_DOWN signal from bottom connector 22, and a PRESENT_UP signal from top connector 20. The PAL 26 provides an ID_UP signal to top connector 20, and generates a TERM_EN signal which is supplied to terminators 30 for establishing terminating connections between bus 24 and the network hub if the network hub is the first hub or last hub in a stack.

Each network hub or other electrical component in the arrangement includes an identifier means for generating a unique identifier for the component. The identifier means in the embodiment of FIG. 3 is implemented by the programmable array logic (PAL) 26. The PAL 26 receives a unique identifier signal on bus ID_DOWN from bottom connector 22, increments the identifier to generate a new unique identifier, and transmits the new unique identifier signal to the top connector 20 on bus ID_UP. In the circuit of FIG. 3, if a component is at the bottom of a stack, the signals on bus ID_DOWN are all high, and PAL 26 will supply all low signals on bus ID_UP. In this manner, each network hub or other electrical component in the arrangement is assigned a unique identifier to allow for bus arbitration and otherwise facilitate communication between the hubs and the network devices associated with the hubs. According to the preferred embodiment of the present invention, the identifier signal transmitted on bus ID_UP is used as the unique identifier for the current network hub. It will be appreciated that the identifier signal on bus ID_DOWN could alternatively be used as the unique identifier for the current network hub. Busses ID_DOWN and ID_UP are preferably 4-line busses, which allow up to 16 unique identifiers to be generated. Larger busses can be used to allow the generation of more unique identifiers for larger stacks or arrangements.

Each network hub or other electrical component in the arrangement can also include a terminating means for selectively establishing a terminating connection between the bus 24 of the circuit of FIG. 3 and a network hub if the network hub is the first or last hub in the stack or arrangement. As will be appreciated by those skilled in the art, a terminating connection is necessary to prevent signal reflection and allow for the propagation of data signals on the bus 24 from one network hub in the stack to another. In the circuit of FIG. 3, the terminating means is implemented by PAL 26 and terminators 30. PAL 26 receives a signal on the line PRESENT_DOWN from the bottom connector 22, which indicates the presence of a network hub below the bottom connector element 22. PAL 20 also receives a signal on the line PRESENT_UP from the top connector 20, which indicates the presence of a network hub above the top connector 20. According to the preferred embodiment of the present invention, a grounded or low state of the signal on lines PRESENT_DOWN or PRESENT_UP indicates the presence of a connector element above or below the current network hub, respectively. It will be appreciated, however, that an alternate convention could be used.

PAL 26 determines whether it is at the bottom, middle, or top of a stack based on the signals on lines PRESENT_UP and PRESENT_DOWN, and bus ID_. If PAL 26 determines it is in a network hub on the bottom of a stack (i.e., the signals on line PRESENT_DOWN and bus ID_DOWN are all high), then it drives bus ID_UP with all low signals, and generates a termination enable signal on line TERM_EN to selectively establish terminating connections as will be described with respect to FIG. 4. If PAL 26 determines that it is not in the bottom of the stack (i.e., the state of the signal on line PRESENT_DOWN is low and the signals on bus ID_DOWN are not all low), then PAL 26 increments the signal on bus ID_DOWN by 1, and outputs the incremented signal on bus ID_UP. If PAL 26 determines that it is at the top of a stack (i.e., the signal on line PRESENT_DOWN is low and the signal on line PRESENT_UP is high), then it generates a termination enable signal on line TERM_EN. It will be appreciated that the PAL 26 located in a hub at the top of a stack still increments the signal on bus ID_DOWN by one and outputs the incremented signal on bus ID_UP to establish the unique identifier for the current (top) network hub even though no top connector is present. If the signals on each of the lines of bus ID_DOWN are all high, and the signal on line PRESENT_DOWN is low, then there are too many components connected in the stack. If the bus ID_DOWN is a 4-line bus, then this condition will be reached if more than 16 busses are present in a stack. In this condition, the signals on the lines of bus ID_UP are all maintained at the high level, thereby creating a non-unique identifier. The two or more components having the same identifier will detect an error or conflict condition, and this error condition can be detected by a network administrator.

The signal on line TERM_EN, which is generated by PAL 26, functions to establish terminating connections between the bus 24 and the network hub only when one of the signals on lines PRESENT_UP or PRESENT_DOWN indicate that there is no network hub located above or below the current network hub. That is, if the signal on either line PRESENT_UP or PRESENT_DOWN is high, indicating that the current network hub is at the top or bottom of a stack, respectively, the signal on line TERM_EN is driven to a low state to enable a terminating connection to be established. If the signals on both lines PRESENT_UP and PRESENT_DOWN indicate that there are network hubs both above and below the current network hub, the signal on line TERM_EN is driven to a high state, and terminating connections between bus 24 and the current network hub are not established. It will be appreciated that alternate conventions of the TERM_EN signal can be used. The specific details of the terminating connections will now be described with respect to FIG. 4.

Referring to FIG. 4, a schematic diagram of a terminating circuit suitable for use as a terminator 30 in FIG. 3 is shown. Terminator 30 receives a signal on line TERM_EN as an input. If the signal on line TERM_EN is low, indicating that the current network hub is at the bottom or top of a stack, then switches 40 are all closed and each line of the associated bus 24 is connected through resistances 42 to a reference voltage supplied by voltage source VREF. Resistances 42 preferably provide an impedance matched or tuned to the frequency of the signals on the bus 24. The voltage source VREF or other suitable element is located in each network hub. If the signal on line TERM_EN is high, indicating that the current network hub is located in the middle of a stack, the switches 40 are all opened to disconnect the lines of the associated bus from the voltage source VREF.

While the foregoing description includes many details and specificities, it is to be understood that these are intended to be illustrative rather than limiting. Numerous modifications to the disclosed embodiments will be readily apparent to those of ordinary skill in the art which do not depart from the spirit and scope of the invention, as defined by the following claims and their legal equivalents.

What is claimed is:

1. An arrangement of interconnected network hubs, comprising:
    a plurality of network hubs, each hub having two substantially identical receiving slots, the substantially identical receiving slots having electrical contacts disposed therein; and
    at least one connector element, each connector element cooperating with one receiving slot from each of two network hubs to electrically connect the two network hubs,
    wherein each network hub in the plurality of network hubs includes an identifier circuit which generates a unique identifier for its associated network hub.

2. The arrangement of claim 1, wherein each network hub further includes a terminating means for selectively establishing a terminating connection in the network hub if the network hub is a first hub or a last hub in the arrangement.

3. The arrangement of claim 2, wherein the terminating connection is established between the network hub and a substantially continuous signal bus formed by the plurality of network hubs and the at least one connector element.

4. The arrangement of claim 2, wherein the identifier circuit and the terminating means are implemented by programmable array logic and terminating circuits located in each network hub.

5. The arrangement of claim 4, wherein the programmable array logic in a network hub generates the unique identifier by receiving a first identification signal and incrementing the identification signal to generate the unique identifier.

6. The arrangement of claim 5, wherein the programmable array logic transmits the unique identifier as a second identification signal through a connector element to another network hub.

7. The arrangement of claim 5, wherein the programmable array logic receives the first identification signal through a connector element from another network hub.

8. The arrangement of claim 5, wherein the first identification signal is generated by the network hub.

9. The arrangement of claim 1, wherein the identifier circuit determines whether its associated network hub is the first in the arrangement.

10. The arrangement of claim 2, wherein the terminating connection is established by connecting a matched impedance between the network hub and the connector element.

11. The arrangement of claim 10, wherein the matched impedance is connected between a voltage source located in the network hub and the connector element.

12. The arrangement of claim 2, wherein the connector element includes a connector body having electrical traces disposed thereon.

13. The arrangement of claim 12, wherein the electrical traces are brought into electrical contact with the electrical contacts in a receiving slot when a connector element is inserted into the receiving slot.

14. The arrangement of claim 12, wherein the electrical traces are printed on the connector body.

15. The arrangement of claim 12, wherein the connector body includes a first layer of electrically conductive signal leads, a dielectric layer surrounding the first layer and having first and second surfaces, and first and second electrically conductive layers disposed on the first and second surfaces, respectively, to provide RF shielding.

16. The arrangement of claim 12, wherein the electrical traces include ground traces and signal traces and the electrical contacts include ground contacts and signal contacts.

17. The arrangement of claim 16, wherein each receiving slot further includes an alignment element and the connector element includes an aligning means which cooperates with the alignment element to ensure that signal traces and ground traces are brought into electrical contact with signal contacts and ground contacts, respectively.

18. The arrangement of claim 17, wherein the aligning means includes a slotted groove in the connector body.

19. The arrangement of claim 12, wherein the identifier circuit and the terminating means are implemented by programmable array logic.

20. The arrangement of claim 19, wherein the programmable array logic in a network hub generates the unique identifier by receiving a first identification signal, incrementing the identification signal to generate the unique identifier.

21. The arrangement of claim 20, wherein the programmable array logic transmits the unique identifier as a second identification signal through a connector element to another network hub.

22. The arrangement of claim 20, wherein the programmable array logic receives the first identification signal through a connector element from another network hub.

23. The arrangement of claim 20, wherein the first identification signal is generated by the network hub.

24. The arrangement of claim 19, wherein the terminating connection is established by connecting a resistance between the network hub and the connector element.

25. The arrangement of claim 24, wherein the resistance is connected between a voltage source located in the network hub and the connector element.

* * * * *